United States Patent [19]

Nagano et al.

[11] Patent Number: 4,740,571
[45] Date of Patent: Apr. 26, 1988

[54] PROCESS FOR GAS PHASE POLYMERIZATION OF VINYL CHLORIDE

[75] Inventors: Mineo Nagano; Michio Saito, both of Shinnanyo, Japan

[73] Assignee: Toyo Soda Manufacturing Co., Ltd., Shinnanyo, Japan

[21] Appl. No.: 925,535

[22] Filed: Oct. 28, 1986

Related U.S. Application Data

[63] Continuation of Ser. No. 704,064, Feb. 21, 1985, abandoned.

[51] Int. Cl.⁴ ............................................. C08F 2/34
[52] U.S. Cl. .................................... 526/201; 526/88; 526/212; 526/216
[58] Field of Search ............... 526/199, 200, 201, 202, 526/212, 216

[56] References Cited

U.S. PATENT DOCUMENTS

| | | | |
|---|---|---|---|
| 3,642,745 | 2/1972 | Golstein | 526/344.1 |
| 3,692,718 | 9/1972 | Golstein | 526/344.1 |
| 3,810,958 | 5/1974 | Takahashi | 526/344.1 |
| 3,899,473 | 8/1975 | Johansson | 526/344.1 |
| 4,090,994 | 5/1978 | Nagano | 526/201 |

Primary Examiner—Christopher Henderson
Attorney, Agent, or Firm—Cushman, Darby & Cushman

[57] ABSTRACT

A process for the gas phase homopolymerization of vinyl chloride or the gas phase copolymerization of vinyl chloride with a monomer copolymerizable therewith, wherein when the breeding ratio first exceeds 3.5 after initiation of the polymerization, the feed rate of a seed polymer is adjusted so that the breeding ratio is maintained at a level of from 3.5 to 5.5.

10 Claims, 1 Drawing Sheet

PROCESS FOR GAS PHASE POLYMERIZATION OF VINYL CHLORIDE

This is a continuation of application Ser. No. 704,064, filed Feb. 21, 1985, now abandoned.

BACKGROUND OF THE INVENTION

1. Field of the Invention

The present invention relates to an improved process for homopolymerizing monomeric vinyl chloride (hereinafter referred to as "VCM") or copolymerizing VCM with a minor amount of a comonomer copolymerizable therewith in the gas phase, in which a product having a good quality is obtained at a high breeding ratio.

The term "breeding ratio" as used herein means the ratio of the amount of the polymer formed by the gas phase polymerization, inclusive of the seed polymer, to the amount of the seed polymer.

2. Description of the Related Art

The gas phase polymerization of VCM is known, for example, from Japanese Examined Patent Publication (Kokoku) Nos. 52-44918 and 48-14666 and U.S. Pat. No. 3,578,646. However, since a product obtained by gas phase polymerization has a poor porous property and homogeneousness, the gelation property at the processing step is degraded and the fish eye characteristic (hereinafter referred to as "FE characteristic") is worst; resulting in a sand-like polymer product. Therefore, although gas phase polymerization has many process advantages, it has been considered to be of little industrial value.

After intensive research, we succeeded in obtaining a product having a highly porous property, a good FE characteristic, and relatively high bulk density, and comparable to a product obtained by the conventional two-stage bulk polymerization or the conventional suspension polymerization, according to the gas phase polymerization, though the polymerization conditions are very limited.

Namely, since the properties of the polymer product are greatly influenced by the properties of the seed polymer, then, to improve the porous property and FE characteristic of the seed polymer, (a) the bulk prepolymerization is carried out at a conversion of 14 to 25% and (b) as the initial additive for the polymerization, (1) a polymeric substance soluble in VCM, preferably together with (2) a lubricant and (3) a stabilizer, is added and the polymerization is then carried out, whereby the particle size distribution is rendered narrow and the internal structure of the particles is modified.

Furthermore, (c) a VCM-soluble polymeric substance as described in (1) above is added as an agent for coating the surfaces of particles at the time of completion of the polymerization.

Moreover, to improve the bulk density, (d) when unreacted VCM is recovered and the polymer is powdered, the inner temperature is elevated to 45° C. to 60° C. and the reaction mixture is stirred at 100 to 300 rpm by a stirrer with an anchor vane to impart heat and shearing to the polymer particles and to smooth the surfaces of the polymer particles without agglomeration of the respective particles, whereby the bulk density is increased.

Still further, (e) the gas phase polymerization is carried out by using the seed polymer under the above-mentioned conditions while controlling the value Pr within the range of from 0.65 to 0.85. The value Pr is a relative pressure Po/Ps wherein Po is an operation pressure in the gas phase polymerization and Ps is a saturated vapor pressure of VCM at the polymerization temperature.

However, it was found that even if the gas phase polymerization is carried out under conditions such that the above requirements are satisfied, since the breeding ratio (the ratio of the sum of the product polymer and the seed polymer to the amount of seed polymer) is increased beyond 6, the following changes are caused in the product.

(1) The particle size is gradually shifted to a coarser side and the content of the fraction left on a sieve is increased.

(2) The bulk density is gradually increased, while the porous property is decreased.

(3) If the polymerization is conducted over a long period of time, the hue at the processing step and the thermal stability are gradually reduced.

(4) The FE characteristic is degraded with the increase of the breeding ratio.

If the reaction is carried out batchwise, a product having an excellent quality, as described above, can be obtained by controlling the breeding ratio within the range of from 5 to 6. However, the productivity is inevitably low where the batchwise reaction is used.

SUMMARY OF THE INVENTION

We, therefore, carried out research with a view to eliminating the above defects, and as a result, have now completed the present invention.

According to the present invention, in a process for the gas phase homopolymerization of vinyl chloride or the gas phase copolymerization of vinyl chloride with a monomer copolymerizable therewith, when the breeding ratio exceeds 3.5, a fresh seed polymer is additionally supplied, and the product in an amount corresponding to the portion exceeding the holding capacity of the reaction vessel is intermittently or continuously withdrawn so that the breeding ratio is maintained within the range of from 3.5 to 5.5.

DESCRIPTION OF THE PREFERRED EMBODIMENTS

Figure 1:
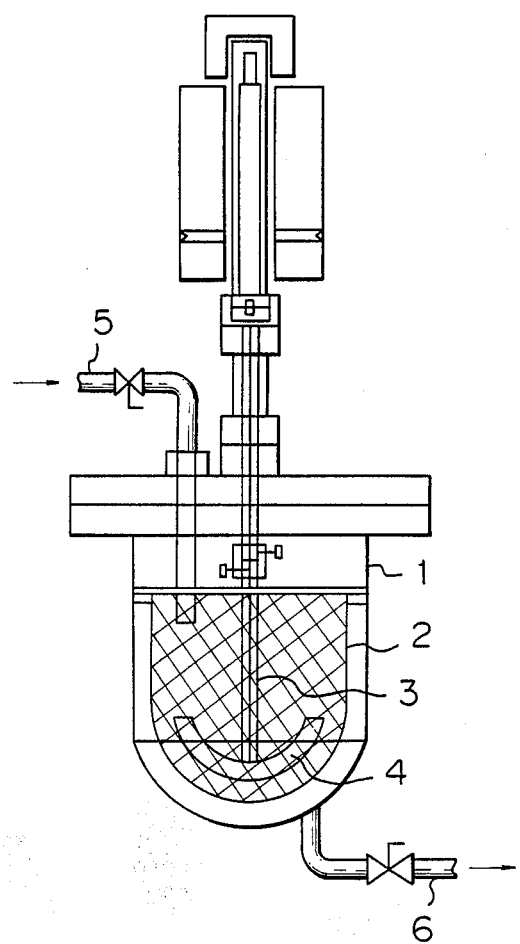
FIG. 1 is a diagram illustrating the interior of a stirring strainer used in the examples.

As means for supplying a fresh seed polymer, the following three methods can be considered.

(1) A method in which a seed polymer powdered in advance by recovering the unreacted monomer is supplied.

(2) A method in which VCM is added to a powdered seed polymer to form a slurry again and the slurry is fed by a slurry-transporting pressure pump and sprayed into a reaction vessel by a spray nozzle.

(3) A method in which bulk prepolymerization is conducted at a conversion of 10 to 25% (in the range where the product can be handled as a slurry) and the slurry is fed by a slurry-transporting pressure pump and sprayed into a reaction vessel by a spray nozzle.

Each of the foregoing three methods can be adopted, but these methods involve the problems described below.

In method (1), if a double lock hopper or the like is used, a powdery seed polymer deaerated can be supplied to a pressure system and a problem of agglomeration does not arise. However, the equipment becomes complicated and powdering of the seed polymer is not economical.

In method (2), if the flow speed in a piping system is at least 1.5 times the sedimentation speed of the slurry, no problem arises in connection with transportation of the slurry. As the result of investigations made into slurry spray nozzles, it was found that in the case of a turning type spray nozzle having an inlet inner diameter smaller than 1.0 mm and an outlet inner diameter smaller than 1.5 mm, plugging is sometimes caused and the performance of the spray nozzle is unsatisfactory. A satisfactory performance can be achieved if the inlet inner diameter is at least 1.5 mm and the outlet inner diameter is at least 2.0 mm. However, if the nozzle opening diameter is too large, spraying becomes difficult, and consequently, it is most preferred that the inlet inner diameter be 1.5 mm and the outlet inner diameter be 2.0 mm. If the slurry concentration is up to 15% by weight, slurry transportation and spraying can be satisfactorily performed. Accordingly, this seed polymer-supplying method for feeding the re-formed slurry is advantageous over method (1) because the necessary equipment is simple. Furthermore, if the powdered seed polymer is passed through a 48-mesh sieve in advance to remove coarse particles, the problem of plugging is not caused during transportation of the slurry and a good performance can be attained. Moreover, since heat and shearing force are applied to the seed polymer at the monomer-recovering step, the seed polymer is in the form of strong solid particles and is present as independent particles after spraying, and therefore, the problem of the agglomeration or formation of coarse particles does not arise. However, this method is troublesome, since the seed polymer has to be once powdered, and thus cannot be regarded as a rational process.

The method (3) for the direct spraying of the slurry formed by bulk polymerization has the best process rationalization. However, if this method is practically worked, several problems arise.

These problems and means for solving these problems will now be described.

(a) Transportation-Possible Concentration

The slurry formed by bulk polymerization has a particle size smaller than the particle size of the repulped slurry, and the viscosity of this slurry is higher. Accordingly, the critical slurry spray-possible concentration is 12% by weight. Where the conversion exceeds 12% by weight, the concentration of the polymer slurry should naturally exceed 12% by weight. Therefore, in this case, it is preferred that VCM be added to the slurry to dilute the slurry to a concentration of 7 to 12% by weight.

(b) Plugging of Slurry Spray Nozzle

The slurry formed by bulk polymerization contains small amounts of coarse particles and scale peeled from the walls of the polymerization vessel, and these coarse particles and scale tend to plug the spray nozzle, even though they are present in only small amounts. This problem will be solved if such coarse particles and scales are removed. However, when an ordinary stationary type strainer is used, even if the mesh size is large, deposition is sequentially caused because of the inherent properties of the slurry, with the result that a layer is formed and the spray nozzle is completely plugged. Ordinarily, a shaking sieve should be used for filtering a slurry, but in case of the present process, a pressure resistance is required for a filter or strainer, and when a space volume is large, precipitation of a dry polymer is caused and good results can not be obtained. In view of the foregoing, we devised a special strainer provided with a stirrer and we succeeded in eliminating the trouble of plugging in the slurry feed pump and spray nozzle by removing coarse particles and peeled scale contained in small amounts in the polymer slurry by using this strainer.

The structure of the strainer is simple, as shown in FIG. 1, comprising a metal wire cylinder (about 20 mesh) inserted as an inner cylinder into a stirrer-equipped autoclave having a capacity of 0.5 to 1 l, though the capacity can be changed according to the slurry feed rate, and the slurry is filtered with stirring. In FIG. 1, reference numerals 1, 2, 3, 4, 5, and 6 represent a barrel portion, a metal wire cylinder, a stirring shaft, a stirring vane, a slurry inlet, and a slurry outlet, respectively.

(c) Formation of Agglomerated Particles

In this gas phase polymerization conducted while spraying the seed polymer slurry, different to the case of gas phase polymerization using the above-mentioned repulped slurry, no heat or shearing force is applied to the polymer slurry and, therefore, the particles are soft and considerable amounts of fine particles are present. It was found that these soft and fine particles act as a binder for polymer particles formed by the gas phase polymerization and promote the formation of agglomerated coarse particles.

We made research with a view to developing means for preventing the formation of aggregated coarse particles, and as a result, the following facts were determined.

(1) Preferably the spray nozzle should have a structure such that the spray region is as broad as possible and the size of sprayed drops is small. If the nozzle diameter is large, the risk of the occurrence of plugging is reduced, but at a low flow rate, falling of large drops or blocks is caused and coarse particles are readily formed. Accordingly, a turning type spray nozzle having critical inlet and outlet diameters that will not cause trouble during the transportation of the polymer slurry, that is, an inlet inner diameter of 1.5 mm and an outlet inner diameter of 2.0 mm, is preferably used as the spray nozzle. If the flow rate is high and the pressure loss is great, it is preferred that a plurality of such spray nozzles be arranged.

(2) As the ratio Pr of the polymerization pressure to the saturated vapor pressure of the monomer at the polymerization temperature is high, the formation of aggregated coarse particles is reduced. Namely, since the value Pr is high, reaction is violent and unreacted VCM is immediately evaporated by the reaction heat, but because the value Pr is low, the particles are not completely dry and coarse particles by agglomeration are hardly formed. However, if the value Pr is larger than 0.85, the FE characteristic of the polymer is degraded. Therefore, it is preferred that the value Pr be in the range of from 0.65 to 0.85.

(3) It is preferred that the mixing shearing force at the step of preparing the seed polymer be applied evenly and uniformly.

(a) For the stirring gas phase polymerization, since particles are present in a discontinuous phase, at a large stirring rotation number only the portion close to the vane is stirred and the central portion is not stirred but remains stationary. Accordingly, to prevent the formation of coarse particles, it is preferred that the entire system be gently stirred at a low speed (20 to 100 rpm) by an anchor type stirring vane. Furthermore, since the height of the powder layer is increased with the advance of the breeding, the upper portion is not sufficiently stirred if the stirring vane is embedded in the powder layer. Thus, it is preferred that the length of the stirring vane be from 0.5 to 1.0 times the maximum height of the powder layer. If the diameter of the reaction vessel is large, stirring of the upper and central portions is often insufficient. In this case, it is preferred that an auxiliary vane for stirring the central portion be used.

(b) In the gas-fluidized gas phase polymerization, the fluidizing speed is 10 to 15 cm/sec, but when the slurry is sprayed, for preventing the formation of coarse particles, it is preferred that the fluidizing speed be increased to about 12 to about 18 cm/sec. Furthermore, in order to prevent local or uneven fluidization, it is preferred that the gas fluidization be carried out with the aid of a stirrer.

(4) Influence of Bulk Density

When the bulk prepolymerization is carried out according to the same recipe, a higher temperature for the recovery of unreacted VCM results in the formation of a seed polymer having a higher bulk density. When the gas phase polymerization is carried out and the seed polymer slurry is sprayed at the same breeding ratio, use of a seed polymer having a higher bulk density results in a reduction of the formation of agglomerated coarse particles. Accordingly, it is preferred that spraying of the seed polymer be effected after the breeding ratio has been increased to a certain level and the bulk density has been elevated to a certain level. Namely, it is preferred that additional seed polymer be supplied after the breeding ratio has been elevated to 3.5.

(5) Agglomeration-Preventing Additive

Different to the case of the formation of a powdery seed polymer, it is preferred that a substance having an agglomeration preventing action, that is, a so-called lubricant such as a higher fatty acid, a higher alcohol, or a metal soap of a higher fatty acid, be added as a coating agent in an amount of 10 to 10000 ppm based on the polymer at the time of completion of the polymerization.

When the above requirements are satisfied, in the polymerization conducted while spraying the seed polymer slurry, the ratio of the formation of agglomerated coarse particles can be reduced to 3% or less, and even if the breeding ratio to the initially fed seed polymer exceeds 6, by controlling the breeding to the seed polymer in the additionally supplied polymer slurry within the range of from 3.5 to 5.5, a gas phase polymerization product having a high density, a good porous property, and a good FE characteristic can be obtained.

Accordingly, only when a product is intermittently withdrawn so that the level of the powder layer is kept constant, i.e., continuous polymerization, can the provision of a product having a good quality become possible.

Furthermore, if the bulk polymerization is carried out in the presence of 10 to 10000 ppm, based on the formed polymer, of a polymeric substance soluble in monomeric vinyl chloride, and after completion of this polymerization, 30 to 10000 ppm, based on the formed polymer, of a polymeric substance soluble in monomeric vinyl chloride is added to the formed polymer slurry and the resulting polymer used as the seed polymer, a gas phase polymerization product especially excellent in the porous property and FE characteristic can be obtained. Moreover, in order to prevent the aggregation of particles, each of the above-mentioned lubricant and stabilizer may be present in an amount of 10 to 5000 ppm based on the formed polymer at the bulk polymerization and the lubricant may be added in an amount of 30 to 5000 ppm based on the formed polymer at the time of completion of the polymerization.

As the polymeric substance, there can be mentioned oil-soluble cellulose derivatives such as nitro cellulose, cellulose acetate (preferably cellulose triacetate), and ethyl cellulose, and ethylene-vinyl acetate copolymers, ethylene-acrylic aid ester copolymers, homopolymers and copolymers of methyl methacrylate, aromatic and aliphatic petroleum resins, modified polyvinyl alcohols having a low degree of saponification, polyvinyl acetate, uncured chloroprene rubbers, uncured nitrile rubbers, and chlorinated polyethylene. These polymeric substances may be used in the form of mixtures of two or more of them.

As the stabilizer, there can be mentioned metal soaps of higher fatty acids such as calcium, zinc, barium and aluminum salts of stearic acid, organic tin compounds such as octyl tin derivatives, butyl tin derivatives and methyl tin derivatives, and antimony derivatives.

The present invention will now be described in detail with reference to the following examples, that by no means limit the scope of the invention.

EXAMPLE 1

(1) Preparation of Seed Polymer

A 100-liter stainless steel polymerization vessel equipped with an anchor type stirrer (having a rising vane length of 250 mm) was coated with a scale deposition-preventing agent so that the amount coated of Evans Blue was 0.2 g/m$^2$, the amount coated of sodium lauryl sulfate was 0.1 g/m$^2$, and the amount coated of polyvinyl alcohol (N-300 supplied by Nippon Gosei) was 2 g/m$^2$, followed by drying.

The polymerization vessel was charged with 3.0 g ethyl cellulose (Etocel T-50, supplied by Hercules), 3.0 g of stearic acid (HSt), 3.0 g of a higher alcohol (Kalcol 68 supplied by Kao Soap), and 3.0 g of dioctyl tin dilaurate (TVS 8105, supplied by Nitto Kasei), and the polymerization vessel was deaerated and 56 kg of VCM was charged in the polymerization vessel. Stirring was effected at 180 rpm and the temperature was elevated by circulating warm water in a jacket, and at an inner temperature of 56° C., 25.0 ml of a 25% solution of isobutyl peroxide (IB) in isoparaffin and 10.0 ml of a 30% solution of 2,4,4-trimethylpentyl-2-peroxyphenoxy acetate (TMP-PA) in isoparaffin were rushed into the polymerization vessel with the aid of 4 kg of VCM to start the polymerization. Cooling water was circulated in the jacket so that the inner temperature was kept constant. After 1.5 hours, 10.0 g of ethyl cellulose T-100 dissolved in VCM was charged with the aid of 2 kg of VCM, mixing was conducted for 5 minutes, and constant pressure recovery was carried out at an inner temperature of 50° C. and an inner pressure of 7.2 kg/cm$^2$. For the initial 60 minutes, warm water maintained at 54° C. was circulated in the jacket, and then the warm water temperature was lowered to 52° C. to slightly reduce the recovery speed. When the inner temperature was elevated to 52° C., spontaneous pressure recovery was carried out and then reduced pressure recovery using a provider (supplied by Jujikin) was performed. After residual VCM was thus removed, the formed polymer was withdrawn. The conversion was 17.1% and the fraction left on a 48-mesh sieve was 1.5%.

(2) Gas Phase Polymerization

A VCM spray nozzle having an inlet inner diameter of 1.0 mm and an outlet inner diameter of 1.5 mm and a slurry spray nozzle having an inlet inner diameter of 1.5 mm and an outlet inner diameter of 2.0 mm were attached to the upper portion of the interior of a 100-liter stainless steel polymerization vessel provided with an anchor type vane having a rising vane length of 400 mm and stirrer equipped with a strip vane attached to the middle stage. The interior of the polymerization vessel was coated with the above-mentioned scale deposition-preventing agent in advance, followed by drying, and the polymerization vessel was charged with 3.8 kg of the above-mentioned seed polymer, followed by stirring at 80 rpm and aeration. The temperature was elevated by circulating warm water in a jacket, and VCM was gradually supplied from the VCM nozzle to elevate the pressure. When the inner temperature and pressure reached 60.5° C. and 7.0 kg/cm$^2$G (Pr=0.75), respectively, 3.0 ml of a 50% solution of di-2-ethoxyethyl-peroxy dicarbonate (EEP) as the initiator in toluene charged in a charger and deaerated was scattered into the polymerization vessel through the VCM nozzle by a pressure pump for feeding VCM, whereby the polymerization reaction was started. The jacket was maintained at a constant temperature of 61.0°.

For removal of the polymerization heat, the stroke number of the pressure pump for feeding VCM was controlled so that the inner temperature was maintained at a constant level. Furthermore, the inner pressure was adjusted so as to recover evaporated excessive VCM gas, and the recovered gas was liquefied by a liquefying cooler and recycled. The amount of the reacted monomer could be seen from the decrease of the amount of VCM determined at predetermined intervals in a metering tank. If the reaction rate was reduced, the initiator was additionally supplied.

(3) Formation of Polymer Slurry

A 30-liter stainless steel polymerization vessel equipped with a stirrer having two stages of turbine vanes was coated with the above-mentioned scale deposition-preventing agent, followed by drying, and the polymerization vessel was charged with 0.55 g of ethyl cellulose T-50, 0.55 g of TVS 8105, 0.55 g of stearic acid (Hst), and 0.18 g of Kalcol 68. Then, the polymerization vessel was deaerated (less than 5 Torr) and 19 kg of VCM was added and the charge was stirred at 700 rpm. The temperature was elevated by circulating warm water in a jacket and at 56.0° C., 3.6 ml of a 20% solution of IB in isoparaffin and 1.6 ml of a 30% solution of TMP-PA in isoparaffin were charged into the polymerization vessel with the aid of 2 kg of VCM to initiate the polymerization. Cooling water was circulated in the jacket so that the inner temperature was kept constant. When the polymerization had been conducted for 2.0 hours, 1.6 g of stearic acid, 0.8 g of barium stearate and 0.5 g of ethyl cellulose T-100 were charged with the aid of 5 kg of VCM to dilute the slurry, and the slurry was cooled and was ready for feeding.

(4) Polymer Slurry-Spraying Polymerization

When the breeding ratio was reached in the above-mentioned stirring gas phase polymerization, the polymer slurry prepared in the 30-liter polymerization vessel was fed to the 100-liter polymerization vessel through a slurry line filled in advance with VCM by a double-diaphragm metering pump and was sprayed through the slurry nozzle. A stirring strainer as shown in FIG. 1 was arranged on the suction side of the slurry pump. After 3 hours, 2.0 kg of VCM was sprayed into the 30-liter polymerization vessel from the upper portion thereof to wash the polymerization vessel. The stirring speed was reduced to 500 rpm, and feeding of the slurry was completed in 4 hours. The average concentration in the fed slurry was 9.17%, and the slurry line was washed by VCM. When the apparent breeding ratio (see the note of Table 1) reached 7.5, 3.5 g of 4,4'-butylidene-bis(3-methyl-6-tert-butyl)phenol and 1.5 g of diphenylmonodecyl phosphite dissolved in advance in VCM were sprayed as the inhibitor into the polymerization vessel, and VCM was recovered and residual VCM was removed by reduced pressure recovery. Then, the product was withdrawn. The obtained results are shown in Table 1.

COMPARATIVE EXAMPLE 1

By using the same seed polymer as used in Example 1, the gas phase polymerization was carried out in the same manner as described in Example 1 except that the polymer slurry formed in the 30-liter polymerization vessel was not sprayed. The polymerization was stopped when the breeding ratio was about 7.5. The obtained results are shown in Table 1.

COMPARATIVE EXAMPLE 2

The polymerization operation was conducted in the same manner as described in Example 1 except that the stirring strainer was not arranged on the suction side of the slurry pump.

After 45 minutes from the point of initiation of the feeding of the slurry, the slurry nozzle became glugged. Accordingly, unreacted VCM was recovered from the 30-liter polymerization vessel and the formed polymer was withdrawn. From the residual polymer amount, it was conjectured that the amount of the fed polymer was 0.15 kg. The obtained results are shown in Table 1.

COMPARATIVE EXAMPLE 3

The procedures of Example 1 were repeated in the same manner except that in preparing the seed polymer slurry in the 30-liter polymerization vessel, only 0.5 g of ethyl cellulose T-50 was added as the coating agent after completion of the polymerization.

EXAMPLE 2

By using the same apparatus as used in Example 1, the gas phase polymerization was carried out under the same conditions as described in Example 1 except that a repulped slurry obtained by charging 1.60 kg of a powdery seed polymer into the 30-liter polymerization vessel, adding 9.40 kg of VCM and stirring the mixture was used instead of the polymer slurry.

TABLE 1

| | | | Example 1 | Example 2 | Comparative Example 1 | Comparative Example 2 | Comparative Example 3 |
|---|---|---|---|---|---|---|---|
| Summary | | | Polymer slurry-spraying polymerization | Repulped slurry-spraying polymerization | No slurry spraying | Polymer slurry-spraying with no stirring strainer | No addition of agglomeration-preventing agent to polymer slurry |
| Conditions for preparation of powdery seed polymer | | | Initial addition: Etocel T-50 3.0 g, HSt 3.0 g TVS 8105 3.0 g, Kalcol 68 1.0 g / Post addition: Etocel T-100 10.0 g / Conversion 17.1%, on-48-mesh fraction 1.5%, bulk density 0.355 | | | | |
| Polymer slurry (30-liter polymerization vessel) | Initial addition | Etocel T-50 | 0.55 g | Powdery seed polymer | | 0.55 g | " |
| | | HSt | 0.55 g | | | 0.55 g | |
| | | TVS8105 | 0.55 g | 1.60 kg | | 0.55 g | |
| | | Kalcol 68 | 0.18 g | VCM 9.40 kg | | 0.18 g | |
| | Post addition | Etocel-100 | 0.5 g | " | | 0.5 g | 0.5 g |
| | | HSt | 1.6 g | | | 1.6 g | Not added |
| | | BaSt*² | 0.8 g | | | 0.8 g | Not added |
| | Dilution by VCM ① | | 5 kg | " | | 5 kg | " |
| | ② | | 2 kg | | | 2 kg | |
| | Amount left after feeding of slurry | | 5 g | None | | 1.50 kg | 10 kg |
| Gas phase polymerization | Polymerization temperature and pressure and Pr value | | colspan: 60.5° C., 7.0 kg/cm²G, Pr = 0.75 | | | | |
| | Slurry spraying | | Feeding for 4 hours (4.5 kg/hr) after arrival of breeding ratio of 3.5 | | Not effected | Plugging caused after passage of 45 minutes | Same as in Example 1, 4 hours (4.5 kg/hr) |
| | Apparent breeding ratio*¹ | | 7.5 (5.22) | 7.6 (5.30) | 7.45 | 7.55 (7.26) | 7.58 (5.29) |
| | Polymerization time (hours) | | 10 | 9.7 | 9.6 | 9.8 | 10.1 |
| | Reactivity (g PVC/gI · hr) | | 390 | 430 | 400 | 410 | 390 |
| | Bulk density | | 0.510 | 0.515 | 0.525 | 0.520 | 0.507 |
| | On-sieve content (%) | 32 mesh | 1.5 | 0.5 | 1.0 | 1.0 | 6.0 |
| | | 48 mesh | 2.3 | 1.5 | 2.0 | 2.5 | 9.8 |
| | FE (number/ 50 cm²) | 5-minutes value | 10 | 6 | 1500 | 1300 | 75 |
| | | 7-minutes value | 4 | 3 | 250 | 200 | 13 |
| | | 9-minutes value | 1 | 0 | 30 | 20 | 3 |
| | Particle size (100-mesh passing fraction, %) | | 56.4 | 64.3 | 35.2 | 43.1 | 45.1 |
| | Amount absorbed of plasticizer (%) | | 25.4 | 26.3 | 21.7 | 22.3 | 23.8 |

Note
¹apparent breeding ratio = amount of polymer formed by gas phase polymerization/amount of seed polymer (3.8 kg) (each parenthesized value indicates the true breeding ratio)
²BaSt = barium stearate

EXAMPLES 3 THROUGH 6 AND COMPARATIVE EXAMPLE 4

By using the same apparatus as described in Example 1, the polymerization was carried out under the same conditions as described in Example 1 except for the following points. The polymer slurry prepared in the 30-liter polymerization vessel was transferred into a slurry tank equipped with a stirrer. Then, the post additive was added to the 30-liter polymerization vessel, and this polymerization vessel was washed with 5 kg of VCM and the washing liquid was charged into the 100-liter polymerization vessel. Residual VCM left in the 30-liter polymerization vessel was recovered, followed by recovery under reduced pressure. The lid of the polymerization vessel was opened to check the residual amount, but it was found that no slurry was left or deposition of scale was not caused. According to the same recipe as described in Example 1, the polymer slurry was sequentially prepared.

In the 100-liter polymerization vessel for performing the gas phase polymerization, a 1B insertion tube was arranged and a 1B automatic valve 1, a metering pipe, and 1B automatic valve 2 were disposed at the outlet and connected to an 80-liter stirring tank. A ¼B automatic valve of nitrogen under 12 kg/cm²G was arranged in the metering pipe. These automatic valves were disposed so that at a predetermined highest point of an ultrasonic level meter attached to the gas phase polymerization vessel the 1B automatic valve 1 was opened, and the 1B automatic valve 1 was closed at a predetermined lowest point, and at this predetermined lowest point the automatic valve 2 was opened to feed the powder in the metering pipe to the stirring tank maintained under 2 kg/cm²G. After a predetermined time, the 1B automatic valve 2 was closed. Every time the above operation was conducted ten-odd times, the ¼B N₂ automatic valve was opened, the 1B automatic valve 2 was closed and the automatic valve 1 was opened, whereby N₂ gas was purged toward the polymerization vessel for a certain time and deposition of scale on the interial of the withdrawal pipe was prevented. In the present apparatus, when the height of the powder layer reached a certain level, the product was intermittently withdrawn, and the inhibitor was added into the 80-liter stirring tank. VCM was recovered and residual VCM was removed by reduced pressure recovery.

The results are shown in Table 2.

TABLE 2

|  |  | Example 3 | Comparative Example 4 | Example 4 | Example 5 | Example 6 |
|---|---|---|---|---|---|---|
| Summary |  | Polymer slurry spraying, twice | Polymer slurry spraying, once | Polymer slurry spraying, third times | Polymer slurry spraying, five times | Polymer slurry spraying, seven times |
| Polymer slurry |  | 30-l polymerization vessel, 56° C., 2 hours | | | | |
|  |  | Ethyl cellulose T-50 0.55 g, HSt 0.55 g, TVS8105 0.55 g | | | | |
|  |  | Kalcol 68 0.18 g, VCM 11 kg, IB 20% 3.6 ml/TMP-PA 1.6 ml | | | | |
|  |  | Post additives: Etocel T-100 0.5 g, HSt 1.6 g, BaSt 0.8 g | | | | |
|  |  | VCM dilution 1    5 kg, 30 l-polymerization vessel | | | | |
|  |  | 2    2 kg, 100-l slurry tank washing | | | | |
| Stirring gas phase polymerization | Polymerization temperature and pressure and value Pr | 60.5° C., 7.0 kg/cm$^2$G, Pr 0.75 | | | | |
|  | Slurry spraying | Feeding of slurry (4.5 kg/hr) after arrival of breeing ratio at 3.5 | | | | |
|  | Apparent breeding ratio | 8.29 | 8.30 | 10.2 | 14.13 | 17.57 |
|  | (true value) | (4.5) | (5.83) | (4.51) | (4.55) | (4.45) |
|  | Reactivity | 430 | 435 | 420 | 420 | 415 |
|  | On-sieve fraction (%)  32-mesh | 1.5 | 1.7 | 1.8 | 2.0 | 1.8 |
|  | 48-mesh | 2.8 | 2.5 | 2.8 | 3.0 | 2.8 |
|  | Particle size (100-mesh passing fraction, %) | 51.7 | 45.3 | 50.6 | 47.9 | 45.8 |
|  | FE test (number/ 50 cm$^2$)  5-minutes value | 11 | 155 | 11 | 10 | 11 |
|  | 7-minutes value | 5 | 15 | 6 | 6 | 6 |
|  | 9-minutes value | 1 | 3 | 1 | 2 | 1 |
| Bulk density |  | 0.525 | 0.537 | 0.527 | 0.528 | 0.530 |

We claim:

1. A process for the gas phase homopolymerization of vinyl chloride or the gas phase copolymerization of vinyl chloride with a monomer copolymerizable therewith, comprising using as a seed polymer a slurry of a polymer of vinyl chloride formed by bulk polymerization without recovering the unreacted monomer from said slurry and which is carried out in the presence of
   10 to 10000 ppm, based on the weight of the formed polymer, of a polymeric substance soluble in monomeric vinyl chloride,
   10 to 5000 ppm, based on the formed polymer, of a lubricant, and
   10 to 5000 ppm, based on the formed polymer, of a stabilizer, and wherein the slurry as the seed polymer is passed through a strainer provided with a stirrer to remove coarse particles before the slurry is supplied to a gas phase polymerization apparatus; and after completion of the bulk polymerization
   30 to 10000 ppm, based on the formed polymer, of a polymeric substance soluble in monomeric vinyl chloride, and
   30 to 10000 ppm, based on the formed polymer, of a lubricant are added to the formed polymer,
wherein when the breeding ratio first exceeds 3.5 after initiation of the gas phase polymerization, a fresh seed polymer is additionally supplied, and the product in an amount corresponding to the portion exceeding the holding capacity of the reaction vessel is intermittently or continuously withdrawn thereby maintaining the breading ratio within a range of from 3.5 to 5.5.

2. A process according to claim 1, wherein a powdered homopolymer or copolymer of vinyl chloride formed by bulk polymerization is supplied as the seed polymer.

3. A process according to claim 1, wherein a slurry formed by adding monomeric vinyl chloride to a powdered homopolymer or copolymer of vinyl chloride obtained by bulk polymerization is supplied as the seed polymer.

4. A process according to claim 1, wherein concentration in the slurry as the seed polymer is adjusted to 7 to 12% by weight.

5. A process according to claim 1, wherein the slurry as the seed polymer is supplied through a turning type nozzle having an inlet diameter of 1.5 mm and an outlet diameter of 2.0 mm.

6. A process according to claim 1, wherein the ratio of the polymerization pressure to the saturated vapor pressure of the monomer at the polymerization temperature is in the range of from 0.65 to 0.85.

7. A process according to claim 1, wherein the polymer in the polymerization apparatus is stirred by an anchor type stirring vane having a vane length 0.5 to 1.0 times the maximum height of a powder layer at a rotation speed of 20 to 100 rpm.

8. A process according to claim 1, wherein the gas phase polymerization is the gas-fluidized gas phase polymerization and the fluidizing speed is 10 to 15 cm/sec.

9. A process according to claim 1, wherein the gas phase polymerization is the slurry-sprayed, gas-fluidized gas phase polymerization and the fluidizing speed is 12 to 18 cm/sec.

10. A process according to claim 1, wherein a lubricant is added to the polymer, in which the gas phase polymerization is completed, in an amount of 10 to 10000 ppm based on said polymer.

* * * * *